This invention relates to an improved tool for installing a threaded insert or other threaded element in a bore within a carrier part.

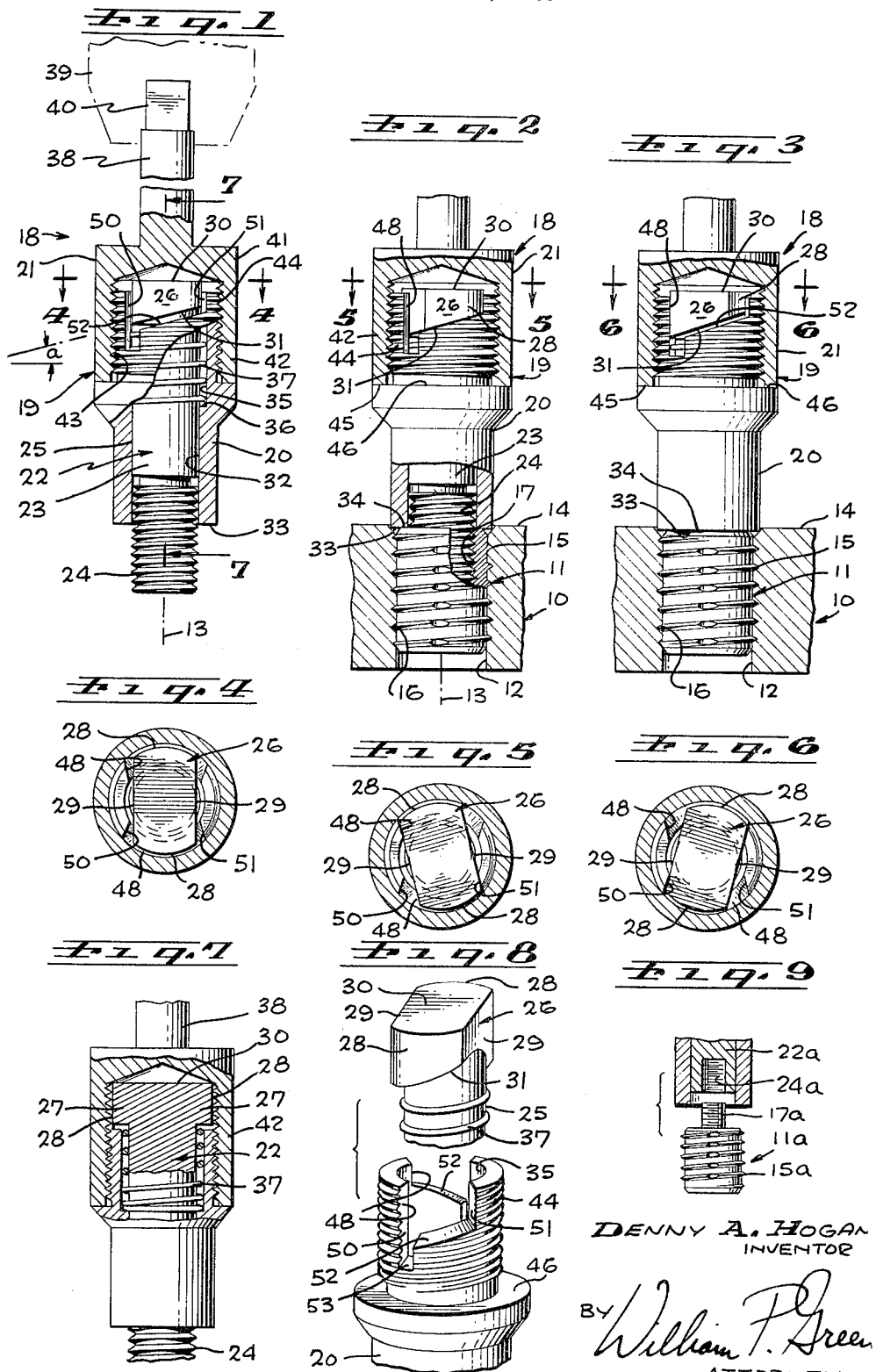
Nov. 1, 1966  D. A. HOGAN  3,282,135
INSTALLATION TOOL FOR THREADED ELEMENT
Filed March 19, 1965
DENNY A. HOGAN
INVENTOR
BY William P. Green
ATTORNEY 3,282,135
INSTALLATION TOOL FOR THREADED ELEMENT
Denny A. Hogan, Garden Grove, Calif., assignor to Newton Insert Co., Los Angeles, Calif., a corporation of California
Filed Mar. 19, 1965, Ser. No. 441,125
7 Claims. (Cl. 81—53)

When a self-tapping type of insert or other threaded element is screwed into a carrier part by an installing tool, there is often a tendency for the development of a binding engagement between the tool and insert, in a manner tending to prevent the tool from being unscrewed and thus removed from the insert after the installing process. As a result, the withdrawing motion of the tool may also withdraw the insert itself, or at least partially withdraw it from the properly installed position.

The general object of the present invention is to provide an improved automatic break-away tool, for installing an insert or threaded element of the above discussed type, and which will automatically release any binding engagement between the tool and element as soon as unscrewing rotation of the tool is commenced. A tool embodying the invention is very positive and reliable in its break-away action, and functions in a manner rendering it virtually impossible to malfunction, even after extended use of the tool over a long period of time. As will be brought out below, the parts forming the present tools are all easily manufactured by conventional machining processes, and are inherently rugged in character and operation to preclude any tendency for unreliability. It will also be noted that the parts are so formed and related as to greatly facilitate initial assembly of the tool during its manufacture, and to facilitate removal of the threaded shank of the tool for replacement if such replacement ultimately becomes necessary.

With regard to the structure of the tool, it may be considered as including two relatively movable sections, a first of which is adapted to be driven rotatively by a power unit or other driving means, and the second of which is movably carried by the first section and has threads for engaging and holding the element to be installed. The first section applies axially inward force to an end surface or other portion of the element to be installed, and attains the desired breakaway action by a mechanism which, upon initiation of an unscrewing or tool withdrawing motion of the first section, acts to automatically free the first section for slight axial retracting movement relative to the second section in a manner releasing any binding engagement which may have developed between the tool and the installed insert. For attaining this break-away action, the second section is provided with a head portion of enlarged transverse dimension, which portion projects radially outwardly into a recess or recesses in a side wall of the "first section," and is engageable with the surfaces which define the recess or recesses in a manner transmitting rotary motion between the two sections (with some lost motion), and also attaining a camming action for releasing the sections for the discussed limited relative axial motion upon initiation of an unscrewing operation. The cam surfaces are located at the axially inner side of the head, and may take the form of two inclined surfaces formed on both the head and engaged wall of the "first section." Preferably, yielding means are provided for urging the second section axially outwardly relative to the first section, with these yielding means desirably taking the form of a coil spring disposed about a reduced dimension shank portion of the second section, adjacent its head.

The "first section" may include two separately formed parts, one of which has the discussed recess or recesses formed therein, while the other acts to extend across the end of the first part at a location opposite the head of the second section, to limit the relative axially outward movement of the second section.

The above and other features and objects of the invention will be better understood from the following detailed description of the typical embodiment illustrated in the accompanying drawing, in which:

FIG. 1 is a side view, partially broken away, of a tool constructed in accordance with the invention, as the tool appears prior to connection of an insert onto the end of the tool;

FIG. 2 is a view similar to FIG. 1, but showing an insert connected onto the tool, with the parts in the condition in which they are found during rotary advancement of the insert into a carrier part;

FIG. 3 shows the tool of FIG. 2 as it appears at the instant of commencement of left hand unscrewing rotation of the tool from the fully installed insert;

FIGS. 4, 5 and 6 are transverse sections taken on lines 4—4, 5—5 and 6—6 respectively of FIGS. 1, 2 and 3 respectively;

FIG. 7 is a fragmentary axial section taken on line 7—7 of FIG. 1;

FIG. 8 is a fragmentary exploded perspective representation of the inner parts of the tool; and FIG. 9 is a fragmentary axial section through a variational tool embodying the invention.

Referring first to FIGS. 2 and 3, I have shown at 10 a carrier part into which a self-tapping or self-threading insert 11 is to be installed. The carrier part initially contains an unthreaded cylindrical bore or passage 12 for receiving the insert, which bore is centered about a main axis 13 of the insert and tool. The outer surface 14 of the carrier part 10 may be planar and disposed transversely of axis 13. Insert 11 is essentially tubular, and has external threads 15 which are capable of forming mating internal threads 16 in cylindrical wall 12 of the carrier part, as insert 11 is screwed into that carrier part. Internally, the insert contains a second set of threads 17, into which a mating screw is ultimately to be connected, and which are utilized for connecting the insert to the installing tool during an installation process.

A tool embodying the invention, for installing insert 11 within bore 12, is illustrated in the drawing at 18. This tool includes a first section 19 formed of two separately manufactured parts 20 and 21, and a second section 22 which is movably carried by section 19. Section 22 has an elongated shank portion 23, extending along main axis 13 of the device, and having at its axially inner (lower) end an external thread 24 corresponding to internal thread 17 within the insert 11. During installation, the insert is screwed onto thread 24 to retain the insert on the tool. Axially outwardly or upwardly beyond threaded portion 24 of shank 23, this shank has an elongated cylindrical external surface 25, centered about axis 13, and continuing upwardly to the location of an enlarged transverse dimension head portion 26 of section 22. This head 26 forms in effect a cross piece, disposed transversely of axis 13, to form two diametrically oppositely projecting lugs 27 as seen clearly in FIG. 7. These two lugs or portions of head 26 are defined at their peripheral ends by two partial cylindrical surfaces 28, of a common diameter and centered about axis 13. The opposite sides of head 26 may form two parallel flats or planar surfaces 29 (FIG. 8), lying in planes which extend parallel to main axis 13 of the device. The axially outer surface 30 of head 26 may be disposed directly transversely of axis 13.

At its axially inner side, each of the radially projecting lugs or portions 27 of head 26 has an inclined cam surface 31, which, as it advances circularly about axis 13 from one of the flats 29 to the other flat 29, also advances axially at a camming angle, as is seen clearly in FIG. 1. These surfaces of the two portions 27 may be identical, and may typically advance at an angle $a$ of between about 5° and 25°, typically about 15°, with respect to a plane disposed directly transversely of axis 13. In extending radially outwardly from the location of cylindrical surface 23 of section 22 to the diameter of peripheral surface 28, camming surfaces 31 may extend directly radially at each location along the circular extent of those surfaces, as is brought out in FIG. 7.

Part 20 of section 18 is tubular, having an internal cylindrical surface 32 of a diameter substantially the same as outer surface 25 of section 22, to function as a bearing or bushing surface for centering section 22 for limited rotary and axial movement relative to part 20. At its axially inner end, part 20 has a transverse annular surface 33, which is engageable with a transverse end surface 34 of the insert to exert axially inward force thereagainst.

At its upper or axially outer end, the part 20 of section 18 has a slightly increased diameter internal cylindrical surface 35 (FIG. 1), centered about axis 13, and defining a transverse annular shoulder 36 at the lower end of surface 35 extending between the diameter of that surface and that of surface 32. A coil spring 37 extends about surface 25 of shank 23, and bears downwardly against shoulder 36 and upwardly against the two oppositely directed portions 27 of head 26. The spring 37 is at all times under compression, to continually exert yielding force upwardly or axially outwardly against head 26, to maintain that head in the position of FIG. 1.

The second part 21 of section 18 of the device has a drive shank 38 which is adapted to be engaged and driven by a chuck portion 39 of a rotary driving tool, for turning part 21 about axis 13. For this purpose, portion 38 of part 21 may have an externally non-circular portion 40, typically square in transverse section, to facilitate gripping of the part by the chuck or other power operated drive element 39. At its lower end, the shank 38 of part 21 carries an enlarged diameter portion 41 of part 21, which forms a tubular socket wall 42 receivable about the upper end of part 20. Wall 42 has internal threads 43 which engage external threads 44 on part 20, to secure parts 20 and 21 rigidly together in fixed relation. A lower shoulder 45 formed at the bottom end of part 21 tightly frictionally engages an opposed shoulder 46 on part 20, and is tightened thereagainst with sufficient force to assure against any accidental detachment of parts 20 and 21, so that in operation and after initial assembly, parts 20 and 21 function together as a single unitary structure.

The two oppositely projecting lug portions 27 of head 26 of section 22 project radially outwardly through two recesses or cut-away areas 48 formed in the side wall of part 20 at the location of inner cylindrical surface 35 and external thread 44. These recesses are at diametrically opposite locations, and may be identical, and extend axially inwardly into the material of the side wall of part 20 from the location of the transverse upper end surfaces 49 of part 20. More particularly, each of the recesses, cut-aways, or notches 48 is defined at one side by a first axially extending side wall 50 (FIGS. 1 and 8), and at the opposite side by a second axially extending side wall 51. At the axially inner end of each recess 48, there is provided an inclined cam surface 52, which, as it advances circularly, also advances axially at the same angle as do cam surfaces 31 of head 26, to engage those surfaces in camming relation. If desired, a narrow portion 53 of each recess 48, adjacent surface 50, may be cut away to an increased depth as seen in FIG. 8, to facilitate manufacture of the device, but with the portion 53 being of a circular extent much smaller than the circular extent of each portion 27 of head 26, so that the head portions can never move axially into the deeply cut-away areas 53. Stated differently, portions 53 are narrow enough that cam surfaces 31 of the head are always opposite at least a portion of each of the cam surfaces 52 of part 20. It is also noted in FIGS. 4, 5 and 6 that head 26 has a circular extent which is smaller than the distance between the opposite side wall surfaces 50 and 51 of the recesses 48, so that head 26 is free to rotate between the position of FIG. 5 and the position of FIG. 6.

To now describe a cycle of operation of the tool, assume that the tool is initially in the condition of FIG. 1, and has been connected to an appropriate driving chuck 39 for operation thereby. With the tool in this condition, an insert 11 is screwed onto the threaded end portion 24 of shank 23 of the tool, until the insert reaches the position of FIG. 2. As the insert is screwed onto shank 23, it turns the shank to a position in which the flats 29 of head 26 of section 22 engage the shorter side walls 51 of recesses 48, as seen in FIG. 2, with spring 37 holding head 26 axially outwardly far enough to maintain surfaces 31 out of engagement with surfaces 52 until flats 29 have thus engaged surfaces 51. After surfaces 29 have engaged surfaces 51, further rotation of the insert about threaded shank 24 will ultimately bring the end of the insert into engagement wtih end surface 33 of part 20, and still further rotation of the insert will then draw shank 24 downwardly until surfaces 31 engage surfaces 52 in the relation illustrated in FIG. 2 (with flats 29 still contacting surfaces 51).

With the tool and insert in the relation illustrated in FIG. 2, the chuck 39 is energized to turn section 18 in a clockwise or righthand direction, to screw the insert 11 into bore 12 and ultimately to the fully installed position of FIG. 2. After the insert reaches this position, chuck 39 is actuated to commence left hand or unscrewing rotation of section 18 of the tool, in order to withdraw shank body 24 from the insert. The initial left hand rotation of section 18, including its two parts 20 and 21, causes these parts to turn about axis 13 in a left hand direction relative to section 22, and more particularly relative to the head 26 of section 22, until the longer side surfaces 50 of the two recesses 48 contact flats 29 of head 26 to transmit left hand rotation to section 22. This limited initial left hand rotation of section 18 relative to section 22 moves cam surfaces 31 out of engagement with cam surfaces 52, to relieve the downward force which has to this point been exerted by head 26 downwardly against section 18, and by that section against the insert. Thus any tendency for tight frictional binding engagement between surfaces 33 and 34 of the tool and insert is overcome, so that the tool may be withdrawn without any danger of also turning the insert in a left hand direction. In this way, threaded shank 34 is freed for unrestrained unscrewing rotation from the insert to withdraw the tool in preparation for the next successive installing operation.

It is contemplated that section 22 may if desired be threaded internally rather than externally for holding and installing stud type devices having a second set of external threads instead of the internal threads 17. Such an arrangement is illustrated fragmentarily in FIG. 9, in which section 22a, corresponding to part 22 of FIG. 1, has internal threads 24a for engagement with external threads 17a of a stud 11a whose threads 15a are to be screwed into a carrier part. Element 20a of FIG. 9 corresponds to the part 20 of FIG. 1, and other portions of the apparatus of FIG. 9 may be identical with the FIGS. 1 to 8 arrangement.

I claim:

1. A tool for installing a threaded element in a carrier part comprising a first section having a drive portion adapted to be turned about an axis, a second section carried by said first section and adapted to be driven about said axis by the first section and free for limited relative rotary and axial motion, a thread on said second section engageable with said threaded element to drive it, and means adapted to be pressed axially inwardly against said element by said first section to apply axially inward force to the element, said second section having a first portion extending axially outwardly within said first section and carrying a head of enlarged transverse dimension, said first section having a side wall extending at least partially about said second section and containing recess means within which said head projects essentially radially outwardly, said head having a side surface engageable with said wall of the first section to transmit rotary motion from said first section to the second section, said head having at an axially inner side thereof an inner surface engageable with an opposed surface formed on said wall of the first section at the inner end of said recess means, at least one of said two last mentioned surfaces having an inclined camming configuration for reducing the extent to which said first section may move axially outwardly relative to the second section upon relative rotation of the first section in an installing direction, and for freeing said first section for increased axially outward movement upon relative rotation of the first section in a reverse unscrewing direction.

2. A tool for installing a threaded element in a carrier part comprising a first section having a drive portion adapted to be turned about an axis, a second section carried by said first section and adapted to be driven about said axis by the first section and free for limited relative rotary and axial motion, a thread on said second section engageable with said threaded element to drive it, and means adapted to be pressed axially inwardly against said element by said first section to apply axially inward force to the element, said second section having a first portion extending axially outwardly within said first section and carrying a head of enlarged transverse dimension, said first section having a side wall extending at least partially about said second section and containing recess means within which said head projects essentially radially outwardly, said head having a side surface engageable with said wall of the first section to transmit rotary motion from said first section to the second section, said head having at an axially inner side thereof an inner surface engageable with an opposed surface formed on said wall of the first section at the inner end of said recess means, at least one of said two last mentioned surfaces having an inclined camming configuration for reducing the extent to which said first section may move axially outwardly relative to the second section upon relative rotation of the first section in an installing direction, and for freeing said first section for increased axially outward movement upon relative rotation of the first section in a reverse unscrewing direction, said first section including two separately formed interconnected parts one of which contains said recess means, and the other of which is receivable axially outwardly of and opposite said head at a location limiting axially outward movement thereof.

3. A tool for installing a threaded element in a carrier part comprising a first section having a drive portion adapted to be turned about an axis, a second section carried by said first section and adapted to be driven about said axis by the first section and free for limited relative rotary and axial motion, a thread on said second section engageable with said threaded element to drive it, means adapted to be pressed axially inwardly against said element by said first section to apply axially inward force to the element, said second section having a first portion extending axially outwardly within said first section and carrying a head of enlarged transverse dimension, said first section having a side wall extending at least partially about said second section and containing recess means within which said head projects essentially radially outwardly, said head having a side surface engageable with said wall of the first section to transmit rotary motion from said first section to the second section, said head having at an axially inner side thereof an inner surface engageable with an opposed surface formed on said wall of the first section at the inner end of said recess means, at least one of said two last mentioned surfaces having an inclined camming configuration for reducing the extent to which said first section may move axially outwardly relative to the second section upon relative rotation of the first section in an installating direction, and for freeing said first section for increased axially outward movement upon relative rotation of the first section in a reverse unscrewing direction, and means yieldingly urging said second section axially outwardly relative to said first section.

4. A tool for installing a threaded element in a carrier part comprising a first section having a drive portion adapted to be turned about an axis, a second section carried by said first section and adapted to be driven about said axis by the first section and free for limited relative rotary and axial motion, a thread on said second section engageable with said threaded element to drive it, means adapted to be pressed axially inwardly against said element by said first section to apply axially inward force to the element, said second section having a first portion extending axially outwardly within said first section and carrying a head of enlarged transverse dimension, said first section having a side wall extending at least partially about said second section and containing recess means within which said head projects essentially radially outwardly, said head having a side surface engageable with said wall of the first section to transmit rotary motion from said first section to the second section, said head having at an axially inner side thereof an inner surface engageable with an opposed surface formed on said wall of the first section at the inner end of said recess means, at least one of said two last mentioned surfaces having an inclined camming configuration for reducing the extent to which said first section may move axially outwardly relative to the second section upon relative rotation of the first section in an installing direction, and for freeing said first section for increased axially outward movement upon relative rotation of the first section in a reverse unscrewing direction, and a coil spring disposed about said second section at the axially inner side of said head and yieldingly urging said second section axially outwardly relative to said first section.

5. A tool for installing a threaded element in a carrier part comprising a first section having a drive portion adapted to be turned about an axis, a second section carried by said first section and adapted to be driven about said axis by the first section and free for limited relative rotary and axial motion, a thread on said second section engageable with said threaded element to drive it, and means adapted to be pressed axially inwardly against said element by said first section to apply axially inward force to the element, said second section having a first portion extending axially outwardly within said first section and carrying a head of enlarged transverse dimension, said first section having a side wall extending at least partially about said second section and containing recess means within which said head projects essentially radially outwardly, said head having a side surface engageable with said wall of the first section to transmit rotary motion from said first section to the second section, said head having at an axially inner side thereof an inner surface engageable with an opposed surface formed on said wall of the first section at the inner end of said recess means, at least one of said two last mentioned surfaces having an inclined camming configuration for reducing the extent to which said first section may move axially outwardly relative to the second section upon relative rotation of the first section in an installing direction, and for freeing said first section for increased axially outward movement upon relative rotation of the first section in a reverse unscrewing direction, said first section including two separately formed interconnected parts one of which is essentially tubular and disposed about said second section and contains said recess means at its axially outer end extending axially inwardly thereinto, the other of said parts being threadedly connected to said axially outer end of said one part and being disposed across and essentially closing said end in a relation confining said head in said recess means.

6. A tool for installing a threaded element in a carrier part comprising a first section having a drive portion adapted to be turned about an axis, a second section carried by said first section and adapted to be driven about said axis by the first section and free for limited relative rotary and axial motion, said second section having a shank portion with a thread formed on an axially inner end thereof to engage and drive said element, said first section including two separately formed parts one of which is essentially tubular and is mounted about said shank for said limited relative rotary and axial motion, means forming a shoulder at the axially inner end of said one part adapted to be pressed axially inwardly against a shoulder on said element by said one part to apply axially inward force to the element, said one part having a tubular side wall containing recess means extending axially inwardly thereinto from its axially outer end, said first section having an enlarged head carried at the axially outer end of said shank and of a transverse dimension greater than the shank and projecting radially outwardly into said recess means, said head having side surfaces engageable with said wall of said one part of the second section to transmit rotary motion from said first section to the second section with some lost motion, said head having at an axially inner side thereof an inner surface engageable with an opposed surface formed on said wall of said one part at the inner end of said recess means in a camming relation acting to reduce the extent to which said one part may move axially outwardly relative to said head upon relative rotation of the first section in an installing direction, and to free said one part for increased axially outward movement upon relative rotation of said one part in a reverse unscrewing direction, a coil spring disposed about said shank adjacent said head and within said one part and urging said head axially outwardly relative to said one part, the other one of said two parts of said first section being connected to said drive portion and being threadedly connected to said one part, said other part being disposed across the axially outer end of said one part at a location opposite said head and being engageable by said head to limit axially outward movement thereof by said spring.

7. A tool as recited in claim 6, in which said recess means include two diametrically opposite interruptions in said side wall of said one part, said head having two portions projecting in diametrically opposite directions into said two interruptions respectively and each having two of said side surfaces at its opposite sides engageable with opposite sides of the interruption and each engaging said side wall of said one part in said camming relation through correspondingly inclined cam surfaces on said head and said wall at the inner ends of said interruptions No references cited.

WILLIAM FELDMAN, *Primary Examiner.*

J. L. JONES, Jr., *Examiner.*